United States Patent
Quiring et al.

(10) Patent No.: US 9,112,387 B2
(45) Date of Patent: Aug. 18, 2015

(54) AIR-COOLED ELECTRICAL MACHINE WITH AUTOMATIC CLUTCH

(75) Inventors: Stefan Quiring, Leverkusen (DE); Kay Hohenboeken, Cologne (DE); Jan Linsel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 495 days.

(21) Appl. No.: 13/346,576

(22) Filed: Jan. 9, 2012

(65) Prior Publication Data

US 2012/0175978 A1     Jul. 12, 2012

(30) Foreign Application Priority Data

Jan. 12, 2011    (DE) .......................... 10 2011 002 555

(51) Int. Cl.
*H02K 9/06*    (2006.01)
*H02K 7/108*   (2006.01)

(52) U.S. Cl.
CPC ................ *H02K 9/06* (2013.01); *H02K 7/1085* (2013.01)

(58) Field of Classification Search
CPC .............. H02K 9/02; H02K 9/04; H02K 9/06
USPC ............ 310/63, 62, 78, 7, 8, 13, 94; 477/7, 8, 477/13
See application file for complete search history.

(56) References Cited

U.S. PATENT DOCUMENTS

| 4,482,830 A * | 11/1984 | Iwaki et al. ................. 310/68 D |
| 2006/0103246 A1* | 5/2006 | Umeda et al. ................... 310/62 |
| 2008/0185926 A1* | 8/2008 | Dessirier et al. ............... 310/63 |
| 2010/0102654 A1* | 4/2010 | Lange et al. .................... 310/62 |

FOREIGN PATENT DOCUMENTS

| DE | 10223422 A1 * | 12/2003 | .............. H02K 9/06 |
| DE | 202006017623 U1 | 4/2007 | |
| DE | 102008042776 B3 | 3/2010 | |
| WO | 201009386 A1 | 7/2010 | |

OTHER PUBLICATIONS

Machine translation of DE 10223422 A1 (Dec. 2003).*

* cited by examiner

*Primary Examiner* — Michael Andrews
(74) *Attorney, Agent, or Firm* — Julia Voutyras; Alleman Hall McCoy Russell & Tuttle LLP

(57) ABSTRACT

The disclosure relates to an air-cooled electromechanical system having a rotor, a driver element, and a fan impeller, the rotor comprising a rotor shaft and field winding. Said disclosure proposes that the fan impeller is rotatably mounted on the rotor shaft and can be connected to and/or disconnected from the rotor and/or the rotor shaft by an automatic clutch.

10 Claims, 5 Drawing Sheets

AIR-COOLED ELECTRICAL MACHINE WITH AUTOMATIC CLUTCH

RELATED APPLICATIONS

The present application claims priority to German Patent Application No. 102011002555.3, filed on Jan. 12, 2011, the entire contents of which are hereby incorporated by reference for all purposes.

FIELD

The present disclosure relates to an air-cooled electrical machine comprising a rotor, including a rotor shaft and a field winding, a driver element, and a fan impeller, rotatably mounted on the rotor shaft. An automatic clutch including the driver element and/or the field winding establishes a connectivity state between the fan impeller and the rotor shaft as a function of the operating state of the electromechanical system. In particular, the present disclosure also relates to an alternator for a motor vehicle and also to a starter generator for a motor vehicle.

BACKGROUND AND SUMMARY

Electrical machines of this kind which, within the meaning of this disclosure, comprise both electric motors and electrical generators, in particular alternators and starter generators for motor vehicles are generally known. A starter generator is to be understood, in particular, to mean an electrical machine which combines the functions of an electric motor, for example of a starter for a motor vehicle, and an electrical generator, for example an alternator, in a single machine.

Air-cooled electrical machines have, for example in their axial extent, a fan or a fan impeller which is usually directly connected, that is to say connected in a rotationally fixed manner, to the shaft of the electrical machine. Therefore, a cooling air stream is generated by the fan impeller during operation of the electrical machine, said cooling air stream providing a corresponding quantity of cooling air, for the purpose of cooling the electrical machine, as a function of the rotation speed of the machine. The air which is circulated by the fan impeller serves, in particular, to cool the electrical machine at and/or in the housing of said electrical machine.

The drive of the fan impeller requires an additional drive torque. In the case of operation of the electrical machine as an electric motor, this is provided by the motor for example, as a result of which the useable mechanical power which can be output by the motor is reduced. In the case of operation as an electrical generator, the additional fan drive torque can be provided by the drive motor which drives the generator, and therefore cannot be recovered for conversion into electrical energy.

Modern control strategies for electrical machines, in particular for electrical generators such as alternators and starter generators of motor vehicles which are used, for example, as belt-driven auxiliary assemblies in motor vehicles, and modern battery management systems often lead to operation of the electrical machine, which is operated as a generator, at a high rotation speed of the machine, but without demanding electrical power. In such cases, the fan impeller is always concomitantly driven in the case of rigid coupling to the rotor shaft as mentioned in the introductory part. This causes mechanical losses, even though cooling of the electrical machine would not be required.

Various clutch devices can be used, for example, to influence the transmission of torque to an auxiliary assembly of a motor vehicle engine, which auxiliary assembly is driven by a belt drive. Clutch devices of this kind are arranged between a drive disk or an output drive disk and a corresponding shaft in order to thus mechanically uncouple the auxiliary assembly from the drive or output drive disk and therefore from the drive motor.

DE 20 2006 017 623 U1 further discloses an electromagnetic clutch with slip monitoring, the torques of a drive motor being transmitted to an auxiliary assembly in vehicles by said electromagnetic clutch. Slip monitoring is performed by a sensor coil, an electronic monitoring device and a voltage amplifier. The electromagnetic clutch substantially comprises a part which drives it and is connected to the rotor in a rotationally fixed manner, and a stationary magnet coil former into which the magnet coil is inserted. The armature disk, which is separated from the rotor by an air gap, is located opposite the rotor when the magnet coil is not electrically excited. The rotor and the armature disk are separated by a spring element. The armature disk is firmly connected to a part which drives the auxiliary assembly. If the magnet coil is electrically excited, the armature disk is drawn toward the rotor against the force of the spring element, so that a torque can be transmitted. If the magnet coil is not electrically excited, the armature disk becomes detached from the rotor again on account of the restoring force of the spring element, and remains in position.

WO 2010/079386 A1 describes a clutch apparatus and a starter generator which comprises this clutch apparatus. The described clutch apparatus comprises both a one-way clutch and an electromagnetic clutch which are arranged between a belt pulley and an associated shaft. The electromagnetic clutch is controlled by an electromagnetic actuator, which is fixed to a stator, for example a coil, by a current for generating a magnetic field being externally impressed on the coil.

The abovementioned clutch devices share the common feature of having a relatively complex and therefore expensive construction. Furthermore, it is usually necessary to supply additional activation energy, for example in order to supply current to a solenoid which acts as an actuator, for the purpose of shifting these clutch devices, that is to say activating and deactivating these clutches.

Against this background, the object of the present disclosure is to specify an air-cooled electrical machine, in particular an alternator and a starter generator for motor vehicles, which is of particularly simple construction and can be produced in a cost-effective manner while further having a high degree of efficiency and, moreover, being distinguished by being robust and having a long service life.

This object is achieved by an air-cooled electromechanical system having a rotor, comprising a rotor shaft and a field winding, a driver element, and a fan impeller, rotatably mounted on the rotor shaft at a predetermined distance relative to the driver element during a first condition and rotatably mounted on the rotor shaft and coupled to the driver element during a second condition.

It should be noted that the features which are cited individually in the claims can be combined with one another in any desired, technically reasonable manner and identify further refinements of the invention. The description additionally characterizes and specifies the invention, in particular in connection with the figures.

The electrical machine according to the disclosure is particularly suitable for use as an electrical generator in motor vehicles, in particular as a three-phase AC generator, alternator or starter generator.

Further advantageous details and effects of the electrical machine are explained in greater detail below with reference to exemplary embodiments which are illustrated in the figures.

DETAILED DESCRIPTION

Figure 1:
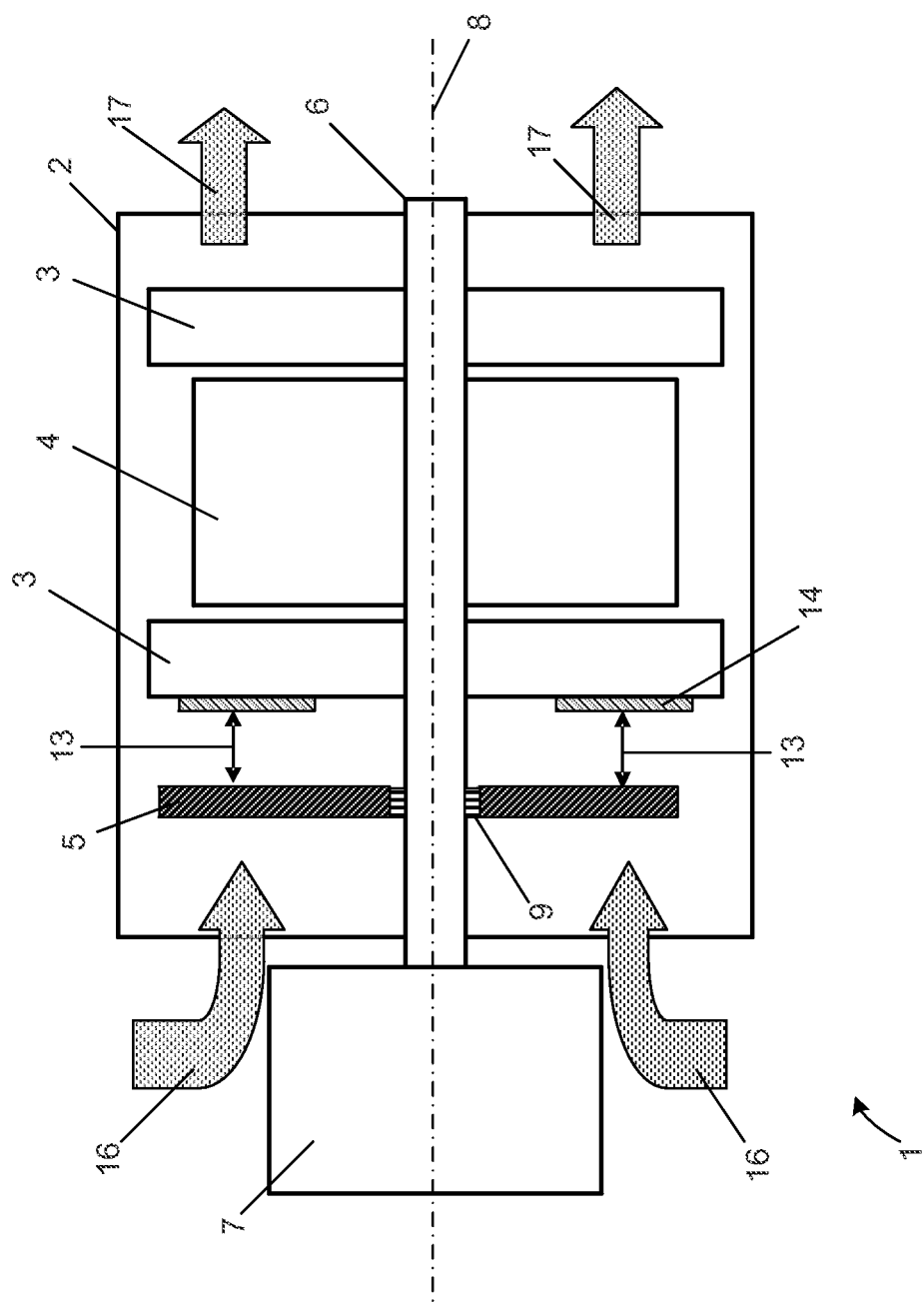
FIG. 1 shows a schematic sectional view of an air-cooled electrical machine within an electromechanical system according to the disclosure.

FIG. 1 shows a schematic side view of an air-cooled electrical machine of an air-cooled electromechanical system according to the disclosure. The illustrated electrical machine is, in particular, a three-phase AC generator 1 or an alternator 1 for a motor vehicle. The alternator 1 can be driven, for example, in a known manner as an auxiliary assembly by an internal combustion engine (not illustrated in FIG. 1) of the motor vehicle by a belt drive.

The alternator 1 has a housing 2 in which a stator (not illustrated in FIG. 1), a rotor 3 with a field winding 4, and a fan impeller 5 are arranged. The rotor 3 comprises a rotor shaft 6 which is rotatably mounted on the housing 2. At one end, a belt pulley 7 is connected to the rotor shaft 6 in a rotationally fixed manner The alternator 1 is driven, that is to say made to rotate, in a known manner by a drive motor (not illustrated), for example an internal combustion engine of a motor vehicle, by the belt pulley 7 and, for example, a belt (likewise not illustrated) which is wrapped around the belt pulley 7.

A rotary movement of the belt pulley 7, which rotary movement is caused by a belt drive arrangement of this kind, leads to a rotary movement of the rotor shaft 6 and also of the rotor 3 and the field winding 4 about a rotation axis 8 which is defined by the rotor shaft 6. The fan impeller 5 is rotatably mounted on the rotor shaft 6 by corresponding bearings 9. Fan impeller 5 may be considered to be in a disconnected state when there is no operative connection between the fan impeller 5 and the rotor 3 or rotor shaft 6. In such a disconnected state, fan impeller 5 may rotate freely about the rotor shaft 6, regardless of the rotary movement of rotor shaft 6. As operating conditions within the electromechanical system 1 change, driver element 14 may react automatically as a function of those changes, thereby coupling fan impeller 5 to rotor 3 and/or rotor shaft 6. In this case, fan impeller 5 may be considered to be in a connected state, where fan impeller 5 substantially follows the rotary movement of rotor 3 and/or rotor shaft 6.

One or more driver element 14 may be in the form of a friction disk, as described below with respect to FIG. 2, or a bimetal, as described below with respect to FIG. 3, and may be located in a plurality of positions, including being mounted to rotor 3, rotor shaft 6, fan impeller 5, and/or bearing 9. As the operating state of the electromechanical system 1 changes, the fan impeller 5 may either be drawn to driver element 14 or driver element 14 may expand to meet fan impeller 5. In either case, a movement represented by arrows 13 causes fan impeller 5 to be connected to rotor 3 and/or rotor shaft 6 via an automatic clutch. The automatic clutch therefore establishes a connectivity state between the fan impeller and the rotor shaft as a function of the operating state of the electromechanical system 1.

When there is a connection between the fan impeller 5 and the rotor 3, the fan impeller 5 follows the rotary movement of the rotor 3 and accordingly generates a cooling air stream 16 which can flow into the housing 2 of the alternator 1 through corresponding openings. The cooling air stream 16 is more powerful the faster the rotor 3 of the alternator 1, and therefore the fan impeller 5, rotates.

The cooling air stream 16 is conducted, in particular, past the heat-generating components of the alternator 1, for example the stator windings (not illustrated in FIG. 2) or the field winding 4 in the housing 2, so that these components can give off their heat to the cooling air stream 16. The cold cooling air stream 16 which flowed in at the front face of the alternator 1 leaves the housing 2, after flowing through further housing openings in the rear part or on the rear face of the alternator 1, as a heated waste air stream 17. This ensures sufficient cooling of the alternator 1 as soon as operating conditions merit such cooling.

Figure 2:
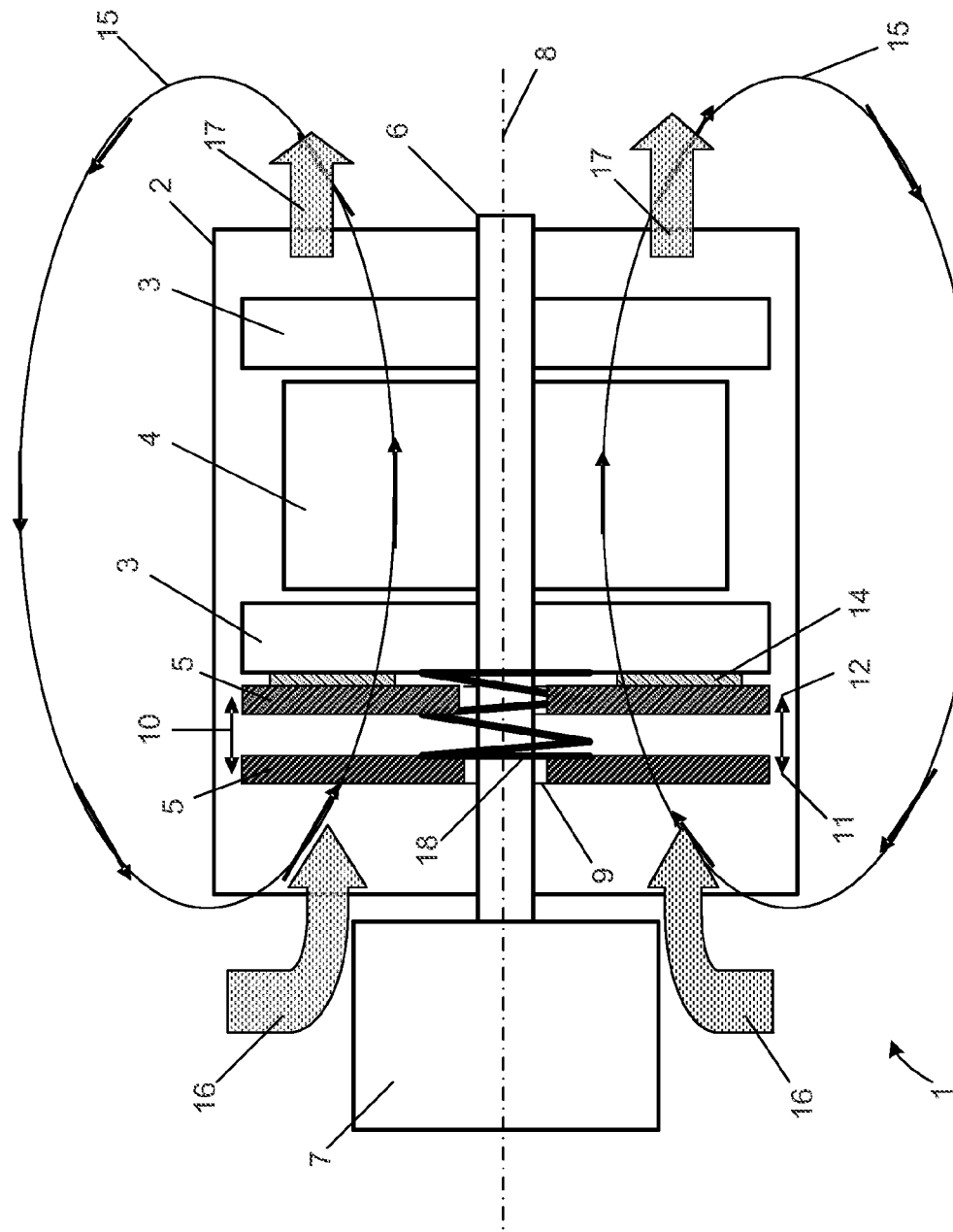
FIG. 2 shows a schematic sectional view of a first exemplary embodiment of the air-cooled electromechanical system shown in FIG. 1.

FIG. 2 shows a first exemplary embodiment of the alternator 1 in which driver element 14 is implemented as a friction disk and bearings 9, and therefore the fan impeller 5, are additionally axially displaceable on the rotor shaft 6, as identified by corresponding arrows 10. In this embodiment, a field winding is included in the automatic clutch, which is electromagnetically controlled.

The fan impeller 5 is illustrated in two axial positions 11 and 12 relative to the rotation axis 8 in FIG. 2; said positions representing two possible operating states of the fan impeller 5. Specifically, these two operating states are a disconnected state 11 and a connected state 12. In the disconnected state 11, there is no operative connection between the fan impeller 5 and the rotor 3 with respect to a rotary movement of the rotor 3. That is to say, the fan impeller 5 is freely rotatable on the rotor shaft 6. In order to maintain the disconnected state 11, the automatic clutch includes a spring element 18 that is preferably arranged between the fan impeller 5 and the rotor 3, said spring element 18 pre-stressing the fan impeller 5 and the rotor 3 at a distance relative to one another. In the event of a rotary movement of the rotor shaft 6, the fan impeller 5 substantially does not follow the rotary movement of the rotor shaft 6 since the fan impeller 5 is uncoupled from the rotary movement of the rotor shaft 6 by the bearing 9 (disregarding the friction in the bearing 9).

In contrast to this, there is an operative connection between the fan impeller 5 and the rotor 3 with respect to a rotary movement of the rotor 3 in the connected state 12. The operative connection preferably takes the form of a force-fitting and/or interlocking connection between the fan impeller 5 and the rotor 3, in particular with the inclusion of a friction disk 14 (driver element) which is arranged between the fan impeller 5 and the rotor 3 in the exemplary embodiment which is illustrated in FIG. 2. In order to provide a secure and effective force-fitting and/or frictional connection between the fan impeller 5 and the rotor 3, the friction disk 14 is composed of a material which is customary for such purposes. The friction disk 14 can be fixed either to the rotor 3 or to the fan impeller 5. It is also possible to use two friction disks 14, of which one is fixed to the fan impeller 5 and one is fixed to the rotor 3 in each case, and therefore the connected state 12 between the fan impeller 5 and the rotor 3 is established by contact between the two friction disks 14.

In the exemplary embodiment which is illustrated in FIG. 2, the fan impeller 5 is pushed against the rotor 3, against the force which is produced by the spring element 18, by a force which is generated by the field winding 4 in the connected state 12. Said force is generated by the magnetic field 15 of the field winding 4 in the exemplary embodiment which is illustrated in FIG. 2.

In the first embodiment, the field winding 4 is an automatic clutch within the meaning of the present disclosure. The field winding 4 controls or establishes the connected state 12 or the disconnected state 11 between the fan impeller 5 and the rotor 3 without an additional, explicit control device. In particular, the field winding 4 acts implicitly as a function of a change in the operating state of the alternator 1, specifically the output or non-output of electrical power, which is determined by the field current, without an additional control and/or monitoring device monitoring or evaluating the operating state of the alternator 1 and possibly generating a special, separate activation signal and/or deactivation signal for establishing the connected 12 or disconnected state 11 between the fan impeller 5 and the rotor 3.

The field winding 4 does not generate a magnetic field 15 in the state in which no current flows through the field winding 4, that is to say for as long as the alternator 1 does not output any electrical power. The force which is generated by the spring element 18 forces the fan impeller 5 away from the rotor 3 in the direction of the spacing, so that the fan impeller 5 assumes the position of the disconnected state 11 which is illustrated in FIG. 2. During this condition, the fan impeller 5 does not follow the rotary movement of the rotor 3 since it is substantially uncoupled from this rotary movement and spaced from the rotor shaft 6 by the bearings 9.

However, as soon as a current is impressed on the field winding 4, said field winding generates a magnetic field 15, the field lines of said magnetic field being indicated by corresponding arrows in FIG. 2. As also shown by FIG. 2, the magnetic field 15 which is generated by the field winding 4 passes through the fan impeller 5 which is expediently composed of a magnetic or magnetized material, for example iron, steel, nickel, cobalt or alloys of these, or is provided with such materials, so that it is drawn in the direction of the field winding 4 by the effect of the magnetic field 15. As soon as the force effect on the fan impeller 5, which force effect is caused by the magnetic field 15, is greater than the opposing force which is generated by the spring element 18, the fan impeller 5 moves, in the axial direction parallel to the rotation axis 8, from the position of the disconnected state 11 to the position of the connected state 12, in which the fan impeller 5 is connected to the rotor 3 in a force-fitting and/or interlocking manner by the friction disk 14. Therefore, during a condition of a magnetic field greater than a threshold being generated, the automatic clutch couples and connects the fan impeller to the rotor and/or rotor shaft. On account of the now force-fitting and/or interlocking connection between the fan impeller 5 and the rotor 3, the fan impeller 5 follows the rotary movement of the rotor 3 and accordingly generates a cooling air stream 16 which can flow into the housing 2 of the alternator 1 through corresponding openings. The cooling air stream 16 is more powerful the faster the rotor 3 of the alternator 1, and therefore the fan impeller 5, rotates. This ensures sufficient cooling of the alternator 1 as soon as it emits electrical power.

The magnitude of the magnetic field 15 and therefore the level of the field current flowing through the field windings 4 which is required in order to move the fan impeller 5 to the connected state 12, and therefore to generate a cooling air stream 16, can be defined by suitable selection of the strength of the spring element 18 or by suitable pre-stressing of the spring element 18. It is therefore possible to effect cooling of the alternator 1 at a relatively high electrical power which is to be output if, for example, cooling is still not required at a relatively low output power of the alternator 1.

Figure 3:
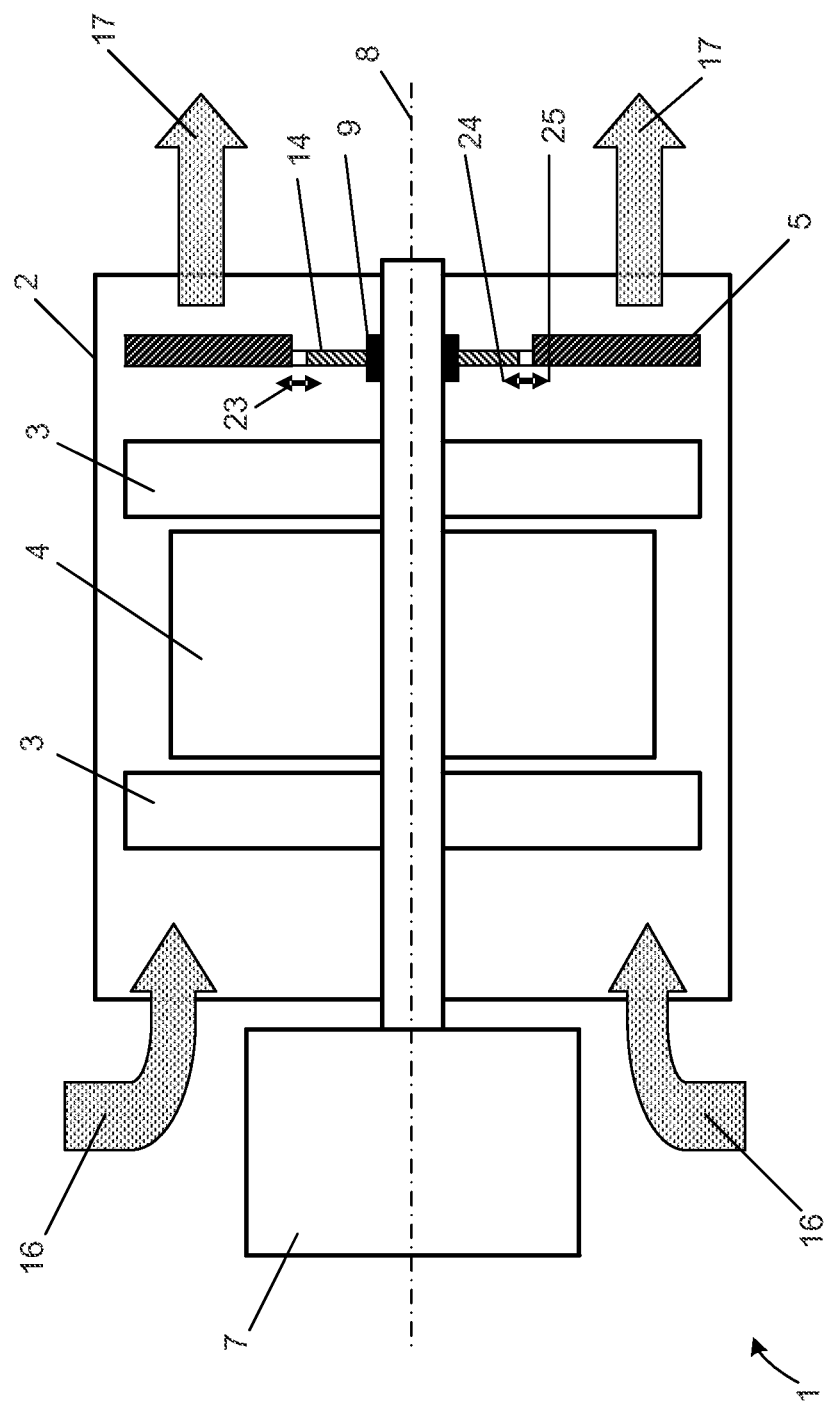
FIG. 3 shows a schematic sectional view of a second exemplary embodiment of the air-cooled electromechanical system shown in FIG. 1.

FIG. 3 shows a schematic sectional view of a second exemplary embodiment of the electrical machine according to the disclosure. The illustrated electrical machine is, in particular, a three-phase AC generator 1 or an alternator 1 for a motor vehicle. As described with respect to FIG. 2, the alternator 1 can be driven, for example, in a known manner as an auxiliary assembly by an internal combustion engine (not illustrated in FIG. 3) of the motor vehicle by a belt drive.

In the alternator 1 which is illustrated in FIG. 3, the fan impeller 5 is rotatably mounted on the rotor shaft 6 by a bearing 9. In contrast to the bearing 9 of the first exemplary embodiment of alternator 1 that is shown in FIG. 2, the bearing 9 of FIG. 3 substantially cannot be axially displaced. Instead, the bearing arrangement of the fan impeller 5 has a bimetal driver element 14, for example a bimetallic spring, in the exemplary embodiment which is illustrated in FIG. 3. The bimetal driver element 14 is fixed to the rotor 3, rotor shaft 6, or bearing 9. As a result of temperature changes, the bimetal driver element 14 can expand or contract in the expansion direction 23 which is indicated by corresponding arrows and is radial with respect to the rotor shaft 6. The radial expansion direction 23 is characterized by two end positions, of which the radially inner position represents a disconnected state 24 and the radially outer position represents a connected state 25 between the fan impeller 5 and the rotor shaft 6 with respect to a rotary movement of the rotor shaft 6. Therefore, in this second embodiment, the automatic clutch includes the bimetal driver element, which is temperature-controlled, as it expands or retracts in proportion to an increase or decrease in temperature.

There is no operative connection between the fan impeller 5 and the rotor shaft 6 with respect to a rotary movement of the rotor shaft 6 in the disconnected state 24. That is to say, the fan impeller 5 is freely rotatable on the rotor shaft 6. If the rotor shaft 6 is rotated, the fan impeller 5 substantially does not follow the rotary movement of the rotor shaft 6 in the disconnected state 24 (disregarding the friction in the bearing 9).

In contrast to this, there is an operative connection between the fan impeller 5 and the rotor shaft 6 with respect to a rotary movement of the rotor shaft 6 in the connected state 25. This operative connection preferably takes the form of a force-fitting and/or interlocking connection between the fan impeller 5 and the rotor shaft 6, in particular between the radially outer end of the bimetal driver element 14 and the inner face of the fan impeller hub which is opposite said radially outer end. Accordingly, the fan impeller 5 follows a rotary movement of the rotor shaft 6 in the connected state 25 and generates a cooling air stream 16. In this state, the quantity of cooling air stream 16 generated is directly dependent on the rotation speed of the rotor shaft 6.

The bimetal driver element 14 is an automatic clutch within the meaning of this disclosure in the case of the alternator 1 which is illustrated in FIG. 3. The bimetal driver element 14 controls or establishes the connected state 25 or the disconnected state 24 between the fan impeller 5 and the rotor shaft 6 without an additional, explicit control device. In particular, the bimetal driver element 14 implicitly acts as a function of a change in the operating state of the alternator 1, specifically the temperature of the alternator 1, which change is determined by the quantity of electrical power which is output by the alternator 1. An additional control and/or monitoring device which monitors and evaluates the operating state of the alternator 1 and/or possibly generates a special, separate activation signal and/or deactivation signal for establishing the connected 25 or disconnected state 24 between the fan impeller 5 and the rotor shaft 6 is not required.

In an operating state with a low operating temperature of the alternator 1, that is to say as long as the alternator 1 does not output any electrical power or outputs a small amount of electrical power, the bimetal driver element 14 is in the disconnected state 24. The fan impeller 5 is not connected to the rotor shaft 6 in a force-fitting and/or interlocking manner with respect to a rotary movement of the rotor shaft 6. Therefore, said fan impeller substantially does not follow a rotary movement of the rotor shaft 6 since it is uncoupled from this rotary movement by the bearing 9.

However, as soon as the operating temperature of the alternator 1 rises, the bimetal driver element 14 expands outward in the radial direction 23 until it ultimately reaches the connected state 25 in which the fan impeller 5 is connected to the rotor shaft 6 in a force-fitting and/or interlocking manner with respect to a rotary movement of the rotor shaft 6 by the bimetal driver element 14. On account of the now force-fitting and/or interlocking connection between the fan impeller 5 and the rotor shaft 6, the fan impeller 5 follows the rotary movement of the rotor shaft 6 and accordingly generates a cooling air stream 16 which flows into the housing 2 of the alternator 1 through corresponding openings.

The cooling air stream 16 is conducted, in particular, past the heat-generating components of the alternator 1, for example the stator windings (not illustrated in FIG. 3) or the field winding 4 in the housing 2, so that these components can give off their heat to the cooling air stream 16. The cold cooling air stream 16 which flowed in at the front face of the alternator 1 leaves the housing 2, after flowing through further housing openings in the rear part or on the rear face of the alternator 1, as a heated waste air stream 17. This ensures cooling of the alternator 1 as soon as said alternator reaches a specific operating temperature. In contrast to the exemplary embodiment which is illustrated in FIG. 2, the exemplary embodiment of alternator 1 as shown in FIG. 3 has the further advantage that it generates a cooling air stream 16 when the actual operating temperature of the alternator 1 requires it to do so. However, the alternator 1 of FIG. 2 generates a cooling air stream 16 as early as when the field winding 4 generates a sufficiently powerful magnetic field, irrespective of the actual operating temperature of the alternator 1. Therefore, the alternator 1 of FIG. 3 causes relatively low mechanical losses since operation of the fan impeller 5 is reduced to a minimum.

As shown in FIG. 3, the fan impeller 5, and consequently the bimetal driver element 14, is expediently arranged at a point inside the housing 2 of the alternator 1 at which the operating temperature of the alternator 1 can be reliably established. This can be, for example, in the vicinity of a heat-generating component or in the rear region of the housing 2 in which the already heated air of the cooling air stream 16 flows past.

In the alternator 1 which is illustrated in FIG. 3, the bimetal driver element 14 combines both the function of the automatic clutch and of the driver element in one component.

The level of the operating temperature of the alternator 1 which is required in order to move the fan impeller 5 to the connected state 25, and therefore to generate a cooling air stream 16, can be defined by suitable selection of the bimetal driver element 14 or by the radial distance between the rotor shaft 6 and the fan impeller 5 which is to be bridged by the bimetal driver element 14.

Figure 4:
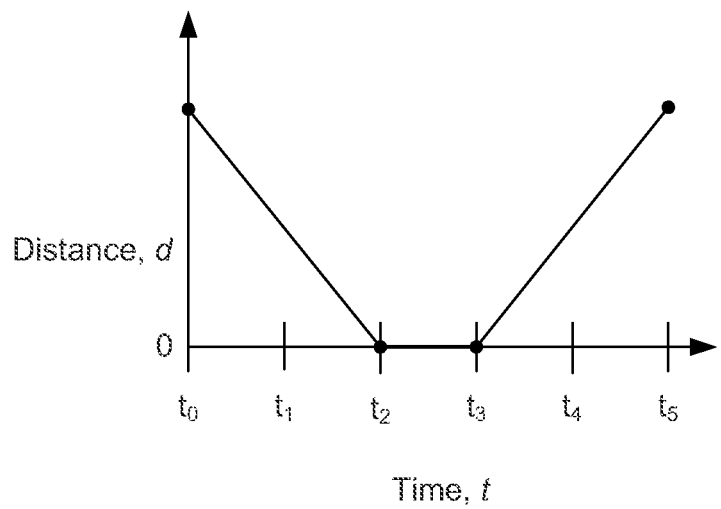
FIG. 4 shows a graphical representation of the separation distance between the fan impeller and rotor shaft of FIG. 1 over time.
Figure 5:
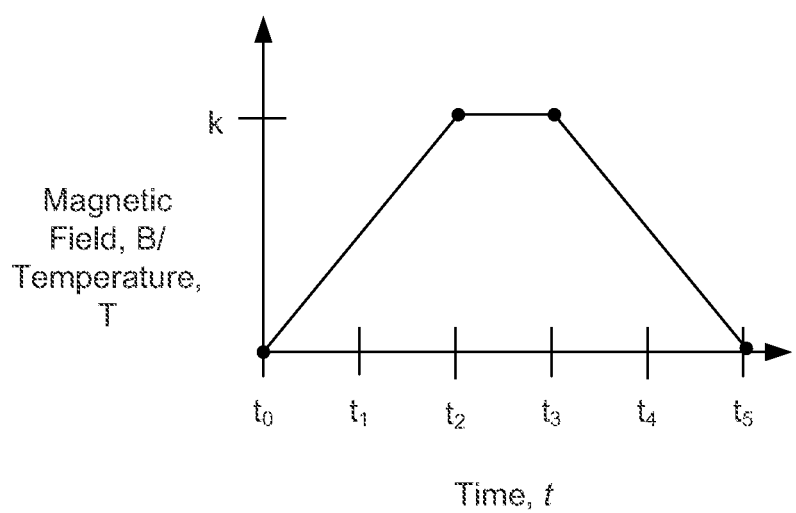
FIG. 5 shows a graphical representation of the environment of the air-cooled electromechanical system of FIG. 1 over time.

FIG. 4 and FIG. 5 show a graphical representation of changes within the electromechanical system 1 over time. FIG. 4 shows the distance, d, between the fan impeller 5 and the rotor 3 and/or rotor shaft 6. At time $t_0$, the distance is greater than 0, therefore fan impeller 5 is separated from rotor 3 and/or rotor shaft 6, and is disconnected. At time $t_1$, d is decreasing, indicating that fan impeller 5 is closer to rotor 3 and/or rotor shaft 6. It is noted that, in embodiments featuring a bimetal driver element 14 as an automatic clutch, such as the second embodiment shown in FIG. 3, distance, d, may correspond to a distance between fan impeller 5 and bimetal driver element 14. In either case, d is indicative of how close fan impeller 5 is to being in a connected state. At time $t_2$, d is shown to be equal to zero, indicating that there is no separation between fan impeller 5 and rotor 3 and/or rotor shaft 6. Therefore, at time $t_2$, fan impeller 5 is in a connected state. At time $t_3$, fan impeller 5 remains in a connected state, however at time $t_4$, d becomes positive once again, therefore causing fan impeller to be in a disconnected state. Finally, at time $t_5$, d is even greater than before, and fan impeller 5 remains in a disconnected state.

FIG. 5 shows the relative magnetic field magnitude and/or temperature changes at times $t_0$ through $t_5$, in accordance with FIG. 4. At time $t_0$, magnetic field magnitude, B, and/or temperature, T, is shown to be some value less than k, where k is taken to be a threshold value, above which operating conditions would be such that the automatic clutch would cause fan impeller 5 to be in a connected state. For instance, k may be a magnetic field magnitude required to overcome the force of spring 18 and pull fan impeller 5 to driver element 14, or k may be a temperature required to expand bimetal driver element 14 far enough to connect with fan impeller 5. In any case, once k is reached, as at time $t_2$ and $t_3$, fan impeller 5 may be considered to be in a connected state.

Figure 6:
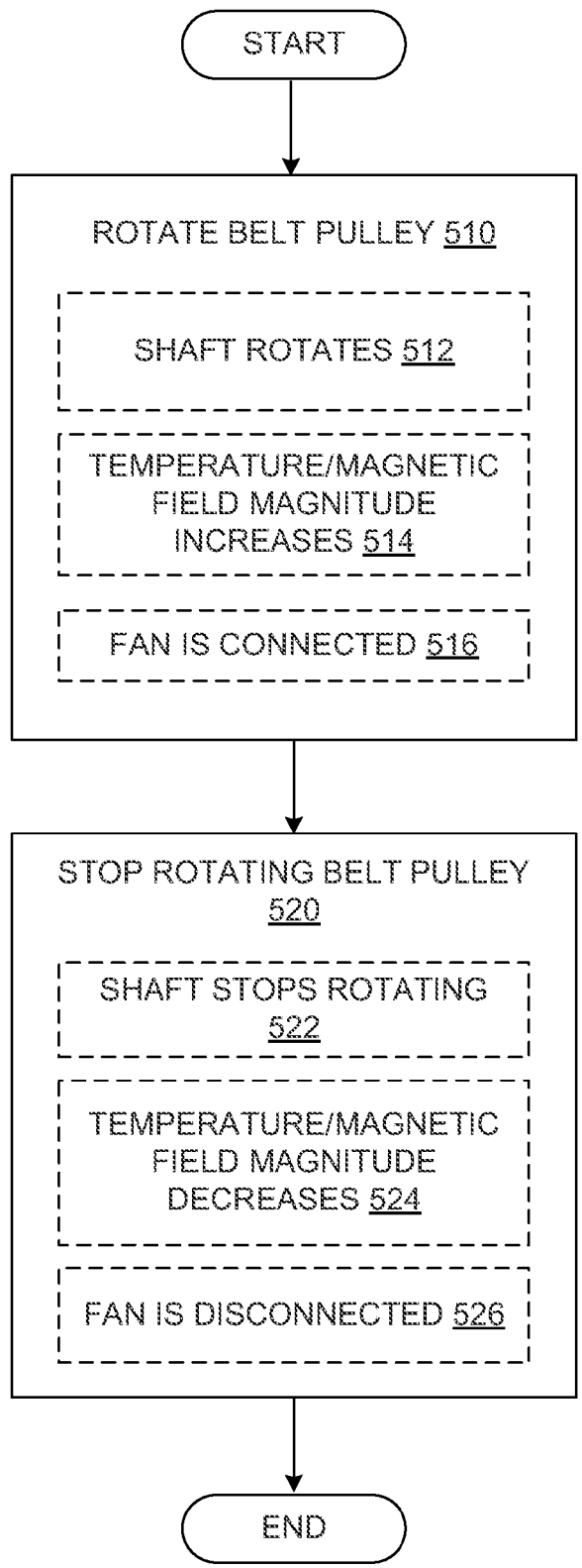
FIG. 6 shows an exemplary method of use of the air-cooled electromechanical system of FIG. 1.

FIG. 6 shows an exemplary method of use of the air-cooled electromechanical system 1, as described in FIGS. 1-5. As shown at step 510, the method begins by rotating a belt pulley 7, the belt pulley 7 being connected to a rotor shaft 6 in a rotationally fixed manner such that the rotary movement of the belt pulley 7 leads to a corresponding rotary movement of the rotor shaft 6, as in 512. In turn, this increases temperature or electromagnetic field magnitude in 514, as a current is impressed on the field winding 4. During a first condition, a first parameter, such as the temperature within the system and/or electromagnetic field magnitude, is increased due to the rotary movement of the rotor shaft, exceeding a threshold of the first parameter defined by the components of the system, and the fan impeller 5 enters a connected state at 516. In this state, an automatic clutch connects fan impeller 5 to rotor 3 and/or rotor shaft 6, thereby controlling the fan impeller 5 to follow the rotary movement of the rotor shaft 6 and produce a cooling air stream. Once the belt pulley 7 stops rotating at step 520, for instance, if the alternator stops being driven, the shaft, in turn, stops rotating as in 522. As a result, temperature and/or magnetic field magnitude within the system decreases in 524, and, as they drop below a threshold during a second condition due to the rotary movement of the rotor shaft, the automatic clutch disconnects the fan impeller 5 from the rotor 3 and/or rotor shaft 6, thereby controlling the fan impeller 5 to rotate freely on the rotor shaft 6.

The electrical machine according to the disclosure is not restricted to the exemplary embodiments described in this document and shown in the figures. In particular, the electrical machine according to the disclosure can be designed both as an electrical generator and as an electric motor and be used accordingly. Consequently, a design of the electrical machine according to the disclosure as what is called a starter generator, which combines the functions of an electric motor (for example a starter) and of an electrical generator (for example an alternator) in one electrical machine, is also covered by the present disclosure.

In a preferred design, the electrical machine according to the disclosure is an air-cooled auxiliary assembly, which is operated as an electrical three-phase AC generator, in a motor vehicle. To this end, the generator likewise has, in addition to a housing, a stator, a rotor, a rotor shaft which is connected to the rotor in a rotationally fixed manner and is rotatably mounted on the housing, and a fan impeller which is rotatably mounted on the rotor shaft, a belt pulley which is connected to the rotor shaft in a rotationally fixed manner and using which the generator is driven, for example, by an internal combustion engine, which is present in the motor vehicle, by a conventional belt drive arrangement.

In this case, the fan impeller can advantageously be connected to and disconnected from the rotor or the rotor shaft by an automatic clutch, in particular an electromagnetically controlled and/or temperature-controlled clutch, for example a field winding or a bimetal, so that the fan impeller generates a cooling air stream, for the purpose of cooling the generator, in cases in which it requires the operating state of the generator, for example when the field winding of the rotor generates a magnetic field and/or the generator temperature exceeds a specific value. In all other cases, the automatic clutch disconnects the fan impeller from the rotor or the rotor shaft, so that the fan impeller no longer follows the rotary movement of the rotor or the rotor shaft. Unnecessary mechanical losses during operation of the electrical machine are avoided in this way, this improving the degree of efficiency of the machine overall.

The invention claimed is:

1. An air-cooled electromechanical system comprising:
   a rotor including a rotor shaft and a field winding;
   a friction disk fixed to the rotor; and
   a fan impeller, rotatably mounted on the rotor shaft at a first axial position at a predetermined distance from the friction disk during a first condition, and at a second, different axial position and connected to the rotor in a force-fitting and/or interlocking manner by the friction disk during a second condition.

2. The air-cooled electromechanical system of claim 1, wherein the field winding is included in an automatic clutch that is electromagnetically controlled.

3. The air-cooled electromechanical system of claim 1, wherein the fan impeller is arranged in a housing.

4. The air-cooled electromechanical system of claim 1, further comprising an automatic clutch including at least one spring element which pre-stresses the fan impeller and the rotor shaft at a distance relative to one another.

5. The air-cooled electromechanical system of claim 1, wherein the air-cooled electromechanical system is an alternator for a motor vehicle.

6. The air-cooled electromechanical system of claim 1, wherein the air-cooled electromechanical system is a starter generator for a motor vehicle.

7. A method of air-cooling an electromechanical system comprising:
   rotating a belt pulley, the belt pulley being connected to a rotor shaft of a rotor in a rotationally fixed manner such that rotary movement of the belt pulley leads to a corresponding rotary movement of the rotor shaft;
   during a first condition, by an automatic clutch, comprising at least one friction disk arranged between a fan impeller and the rotor, axially displacing the fan impeller from a first axial position to a second, different axial position to connect the fan impeller to the rotor in a force-fitting and/or interlocking manner, thereby controlling the fan impeller to follow the rotary movement of the rotor shaft and produce a cooling air stream; and
   during a second condition, by the automatic clutch, axially displacing the fan impeller from the second axial position to the first axial position to disconnect the fan impeller from the rotor, thereby controlling the fan impeller to rotate freely on the rotor shaft.

8. The method of claim 7, wherein the first condition comprises exceeding a threshold of a first parameter due to the rotary movement of the rotor shaft, and the second condition comprises not exceeding the threshold of the first parameter due to the rotary movement of the rotor shaft.

9. The method of claim 8, wherein the first parameter is a magnitude of an electromagnetic field.

10. The method of claim 7, wherein the automatic clutch further comprises at least one spring element which pre-stresses the fan impeller and the rotor at a distance relative to one another.

* * * * *